US009330500B2

(12) United States Patent
Karsch et al.

(10) Patent No.: US 9,330,500 B2
(45) Date of Patent: May 3, 2016

(54) INSERTING OBJECTS INTO CONTENT

(75) Inventors: Kevin Karsch, Urbana, IL (US); Varsha Chandrashekhar Hedau, Sunnyvale, CA (US); David A. Forsyth, Urbana, IL (US); Derek Hoiem, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 13/314,723

(22) Filed: Dec. 8, 2011

(65) Prior Publication Data
US 2013/0147798 A1 Jun. 13, 2013

(51) Int. Cl.
*G06T 19/00* (2011.01)

(52) U.S. Cl.
CPC .................................. *G06T 19/006* (2013.01)

(58) Field of Classification Search
USPC ........................................................ 345/420
See application file for complete search history.

(56) References Cited

U.S. PATENT DOCUMENTS

| 7,193,633 B1* | 3/2007 | Reinhardt et al. ............ 345/629 |
| 2007/0098290 A1* | 5/2007 | Wells ........................... 382/254 |
| 2009/0027391 A1* | 1/2009 | Burley et al. ................. 345/426 |
| 2012/0183204 A1* | 7/2012 | Aarts et al. .................... 382/154 |

OTHER PUBLICATIONS

Lalonde, Jean-François, et al. "Photo clip art." ACM Transactions on Graphics (TOG). vol. 26. No. 3. ACM, 2007.*
Kang, Hyung Woo, et al. "Tour into the picture using a vanishing line and its extension to panoramic images." Computer Graphics Forum. vol. 20. No. 3. Blackwell Publishers Ltd, 2001.*
Yu, Yizhou, et al. "Inverse global illumination: Recovering reflectance models of real scenes from photographs." Proceedings of the 26th annual conference on Computer graphics and interactive techniques. ACM Press/Addison-Wesley Publishing Co., 1999.*
Loscos, Céline, George Drettakis, and Luc Robert. "Interactive virtual relighting of real scenes." Visualization and Computer Graphics, IEEE Transactions on 6.4 (2000): 289-305.*
Wu, Tai-Pang, et al. "Natural shadow matting." ACM Transactions on Graphics (TOG) 26.2 (2007): 8.*
Gibson, Simon, and Alan Murta. Interactive rendering with real-world illumination. Springer Vienna, 2000.*
Alnasser, Mais et al., "Image-Based Rendering of Synthetic Diffuse Objects in Natural Scenes", *The 18th International Conference on Pattern Recognition*, (2006), 4 pages.
Barrow, Harry G., et al., "Recovering Intrinsic Scene Characteristics from Images", *In Comp. Vision Sys*, 1978, (Apr. 1978), 23 pages.
Blake, Andrew "Boundary Conditions for Lightness Computation in Mondrian World", *Computer Vision, Graphics and Image Processing*, (May 22, 1985), pp. 314-327.
Boivin, Samuel et al., "Image-Based Rendering of Diffuse, Specular and Glossy Surfaces from a Single Image", *In Proc. ACM SIGGRAPH*, (2001), pp. 107-110.

(Continued)

*Primary Examiner* — Abderrahim Merouan
*Assistant Examiner* — Vu Nguyen

(57) ABSTRACT

An image into which one or more objects are to be inserted is obtained. Based on the image, both a 3-dimensional (3D) representation and a light model of the scene in the image are generated. One or more objects are added to the 3D representation of the scene. The 3D representation of the scene is rendered, based on the light model, to generate a modified image that is the obtained image modified to include the one or more objects.

30 Claims, 8 Drawing Sheets

(56) References Cited

OTHER PUBLICATIONS

Carroll, Robert et al., "Illumination Decomposition for Material Recoloring with Consistent Interreflections", *ACM Trans. Graph. 30*, (Aug. 2011), 9 pages.
Cossairt, Oliver et al., "Light Field Transfer: Global Illumination Between Real and Synthetic Objects", *ACM Trans. Graph. 27*, (Aug. 2008), 2 pages.
Criminisi, A. "Single View Metrology", *Int. J. Comput. Vision 40*, (Nov. 2000), 8 pages.
Debevec, Paul "Rendering Synthetic Objects into Real Scenes: Bridging Traditional and Image-Based Graphics with Global Illumination and High Dynamic Range Photography", *University of California at Berkeley; In SIGGRAPH 98*, (Jul. 1998), 10 pages.
Farenzena, M. et al., "Recovering Intrinsic Images Using an Illumination Invariant Image", *In ICIP*, (2007), 4 pages.
Fournier, Alain et al., "Common Illumination between Real and Computer Generated Scenes", *Technical Report; Department of Computer Science, University of British Columbia*, Canada, (1992), 8 pages.
Funt, Brian V., et al., "Recovering Shading from Color Images", *ECCV '92, Second European Conference on Computer Vision*, (May 1992), 14 pages.
Furukawa, Yasutaka et al., "Accurate, Dense, and Robust Multi-View Steropsis", *IEEE PAMI 32*, (Aug. 2010), 8 pages.
Greger, Gene et al., "The Irradiance Volume", *IEEE Computer Graphics and Applications 18*, (1998), 4 pages.
Grosse, Roger et al., "Ground truth dataset and baseline evaluations for intrinsic image algorithms", *In ICCV 2009*, (2009), 8 pages.
Guo, Ruiqi et al., "Single-Image Shadow Detection and Removal using Paired Regions", *In CVPR*, (2011), 8 pages.
Hedau, Varsha et al., "Recovering the Spatial Layout of Cluttered Rooms", *In ICCV 2009*, (2009), 8 pages.
Hoiem, et al., "Automatic Photo Pop-up", *Proceedings of ACM SIGGRAPH*, vol. 24 Issue 3, Jul. 2005, pp. 577-584.
Horn, Berthold et al., "Determining Lightness from and Image", *Computer Vision, Graphics and Image Processing 3*, (1974), pp. 277-299.
Horry, Youichi et al., "Tour into the Picture: Using a Spidery Mesh Interface to Make Animation from a Single Image", *Proceedings of the 24th annual conference on Computer graphics and interactive techniques*. ACM Press/Addision-Wesley Publish Co., (1997), 9 pages.
Kee, Eric et al., "Exposing Digital Forgeries from 3-D Lighting Environments", *In WIFS*, (Dec. 2010), 2 pages.
Khan, Erum A., et al., "Image-Based Material Editing", *ACM Trans. Graph. 25*, (Jul. 2006), 10 pages.
Lalonde, Jean-Francois et al., "Using Color Compatibility for Assessing Image Realism", *In ICCV*, (2007), 9 pages.
Lalonde, Jean-Francois et al., "Webcam Clip Art: Appearance and Illuminant Transfer from Time-lapse Sequences", *ACM Trans. Graph. 28*, (2009), 10 pages.
Land, Edwin H., et al., "Lightness and Retinex Theory", *Journal of the Optical Society of America*, vol. 61, No. 1, (Jan. 1971), 11 pages.
Lee, David C., et al., "Estimating Spatial Layout of Rooms using Volumetric Reasoning about Objects and Surfaces", *Advances in Neural Information Processing Systems (NIPS)*, (Dec. 1, 2010), 10 pages.
Lee, David C., et al., "Geometric Reasoning for Single Image Structure Recovery", *In CVPR*, (2009), 8 pages.
Levin, et al., "Spectral Matting", *IEEE Conference on Computer Vision and Pattern Recognition*, (Oct. 2008), 14 pages.
Liebowitz, David et al., "Creating Architectural Models from Images", *In Eurographics*, vol. 18, (1999), 13 pages.
Lopez-Moreno, Jorge et al., "Compositing Images Through Light Source Detection", *Computers & Graphics 24*, (2010), 10 pages.
Merrell, Paul et al., "Interactive Furniture Layout Using Interior Design Guidelines", *ACM Trans. Graph. 30*, (Aug. 2011), 9 pages.
Mury, Alexander A., et al., "Representing the light field in finite three-dimensional spaces from sparse discrete samples", *Applied Optics 48*, (Jan. 20, 2009), pp. 450-547.
Oh, Byong M., "Image-Based Modeling and Photo Editing", *28th annual conference on Computer graphics and interactive techniques, SIGGRAPH Proceedings*, (2001), 10 pages.
Rother, Carsten "A new Approach to Vanishing Point Detection in Architectural Environments", *IVC 20*, 9-10, (Aug. 2002), 10 pages.
Sato, Imari et al., "Illumination from Shadows", *IEEE Transactions on Pattern Analysis and Machine Intelligence*, vol. Y, No. Y (2003), 11 pages.
Saxena, Ashutosh et al., "Make3D: Depth Perception from a Single Still Image", *Proceedings of the 23rd National Conference on Artificial Intelligence*—vol. 3, AAAI Press, (2008), 6 pages.
Sinha, et al., "Interactive 3D Architectural Modeling from Unordered Photo Collections", *ACM Transactions on Graphics*, vol. 27, No. 5, Article 159, (Dec. 2008), pp. 159:1-159:10.
Tappen, Marshall F., et al., "Estimating Intrinsic Component Images using Non-Linear Regression", *In CVPR*, vol. 2, (2006), 8 pages.
Tappen, Marshall F., et al., "Recovering Intrinsic Images from a Single Image", *IEEE Trans. PAMI 27, 9*, (Sep. 2005), 8 pages.
Wang, Yang et al., "Estimation of multiple directional light sources for synthesis of augmented reality images", *Graphical Models 65*, (Feb. 25, 2003), pp. 186-205.
Weiss, Yair "Deriving Intrinsic Images from Image Sequences", *In ICCV, II*, (2001), 8 pages.
Yeung, Sai-Kit et al., "Matting and Compositing of Transparent and Refractive Objects", *ACM Trans. Graph. 30*, (2011), 14 pages.
Yu, Lap-Fai et al., "Make it Home: Automatic Optimization of Furniture Arrangement", *ACM Trans. Graph. 30*, (Aug. 2011), 11 pages.
Zhang, Li et al., "Single View Modeling of Free-Form Scenes", *Journal of Visualization and Computer Animation*, vol. 13, No. 4, (2002), 9 pages.

\* cited by examiner

INSERTING OBJECTS INTO CONTENT

GOVERNMENT LICENSE

This invention was made with Government support under contract number 09-16014 awarded by the National Science Foundation, contract number 09-04209 awarded by the National Science Foundation, grant/contract number N00014-01-1-0890 awarded by the Office of Naval Research, and grant/contract number N00014-10-1-0934 awarded by the Office of Naval Research. The Government has certain rights in the invention.

BACKGROUND

As computing devices have become more powerful and commonplace, users increasingly view and manipulate photographs on their computers. One type of manipulation that is of interest to users is inserting objects into their photographs. Although an object can be inserted into a photograph by simply pasting or adding the object into the photograph, such techniques typically result in the object that was added looking out of place. Accordingly, it remains difficult for users to insert objects into their photographs and obtain a result that appears realistic, as if the object were actually part of the scene that the photograph is of.

SUMMARY

This Summary is provided to introduce subject matter that is further described below in the Detailed Description. Accordingly, the Summary should not be considered to describe essential features nor used to limit the scope of the claimed subject matter.

In accordance with one or more aspects, an image of a scene is obtained. A 3-dimensional (3D) representation of the scene and a light model for the scene are generated based on the image. One or more objects are inserted into the 3D representation of the scene, and the 3D representation of the scene is rendered, based on the light model, to generate a modified image of the scene including the one or more objects.

In accordance with one or more aspects, an image of a scene is obtained. Locations of one or more interior lighting sources in the image and locations of one or more shafts of light in the image are identified based on the image. An amount of shadowing of each of multiple pixels in the one or more shafts of light is identified, and a direction of each of the one or more shafts of light is determined. The locations of one or more interior lighting sources in the image, the locations of one or more shafts of light in the image, the amount of shadowing of each of multiple pixels in the one or more shafts of light, and the direction of each of the one or more shafts of light are maintained as a light model for the scene.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Inserting objects into content is discussed herein. An image, such as a photograph, into which one or more objects are to be inserted is obtained. Based on the image, a 3-dimensional (3D) representation of the scene in the image is generated and a light model of the scene in the image is generated. The one or more objects are added to the 3D representation of the scene. The 3D representation of the scene is then rendered, based on the light model, to generate a modified image (which is the obtained image modified to include the one or more objects).

Figure 1:
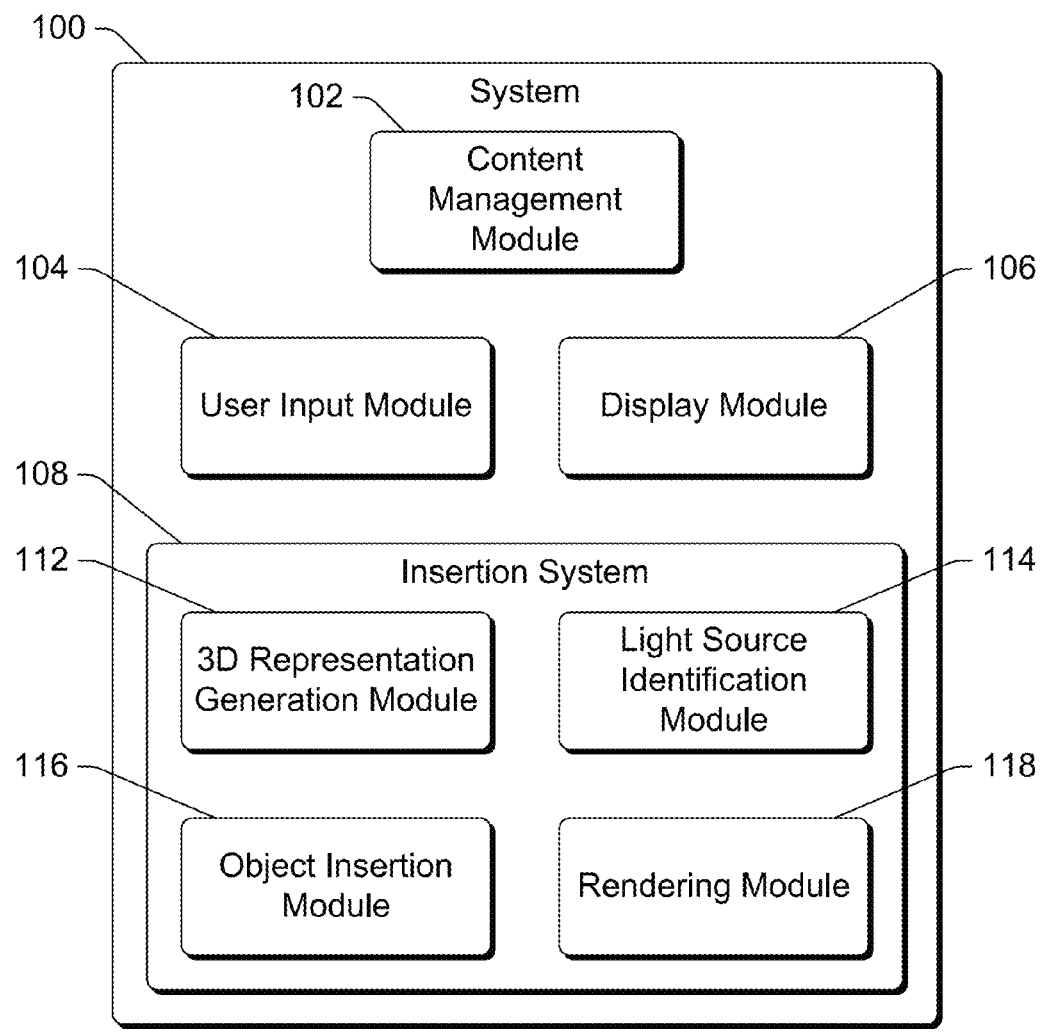
FIG. 1 illustrates an example system implementing the inserting objects into content in accordance with one or more embodiments.

FIG. 1 illustrates an example system 100 implementing the inserting objects into content in accordance with one or more embodiments. System 100 includes a content management module 102, a user input module 104, a display module 106, and an insertion system 108. Insertion system 108 includes a 3-dimensional (3D) representation generation module 112, a light source identification module 114, an object insertion module 116, and a rendering module 118. Although particular modules are illustrated in FIG. 1, it should be noted that functionality of one or more modules can be separated into multiple modules, and/or that functionality of one or more modules can be combined into a single module.

In one or more embodiments, system 100 is implemented by a single device. Any of a variety of different types of devices can be used to implement system 100, such as desktop or laptop computer, a server computer, a cellular or other wireless phone, a digital camera, and so forth. Alternatively, system 100 can be implemented by multiple devices, with different devices including different modules. For example, one or more modules of system 100 can be implemented at least in part by one device (e.g., a desktop computer), while one or more other modules of system 100 are implemented at least in part by another device (e.g., a server computer accessed over a communication network). In embodiments in which system 100 is implemented by multiple devices, the multiple devices can communicate with one another over various wired and/or wireless communication networks (e.g., the Internet, a local area network (LAN), a cellular or other wireless phone network, etc.) or other communication media (e.g., a universal serial bus (USB) connection, a wireless USB connection, and so forth).

Content management module 102 manages content, including obtaining content and/or providing content to other devices or systems. The content can be in various forms, such as a single image, a set of multiple images (e.g., video), and so forth. An image is oftentimes a photograph, although images can take other forms such as drawings, paintings, and so forth. Content management module 102 can obtain content in various manners, such as from an image capture device of system 100, from another system or device, from a storage device (e.g., magnetic disk, optical disc, Flash memory, etc.) of system 100, and so forth. Content management module 102 can also provide content to other devices or systems in various manners, such as emailing content, saving content in a particular location of a storage device or to a particular service, and so forth.

User input module 104 receives inputs from a user of system 100, and provides an indication of those user inputs to various modules of system 100. User inputs can be provided by the user in various manners, such as by touching portions of a touchscreen or touchpad with a finger or stylus, manipulating a mouse or other cursor control device, providing audible inputs that are received by a microphone of system 100, moving hands or other body parts that are detected by an image capture device of system 100, and so forth.

Display module 106 displays a user interface (UI) for system 100, including displaying images or other content. Display module 106 can display the UI on a screen of system 100, or alternatively provide signals causing the UI to be displayed on a screen of another system or device.

Insertion system 108 facilitates inserting objects into content. Generally, content management module 102 obtains content and makes the content available to insertion system 108. 3D representation generation module 112 generates, based on an image of the content, a 3D representation of the scene in the image. If the content includes multiple images, then the 3D representation is a 3D representation of the scene in one of the multiple images. This 3D representation of the scene includes an estimation of materials included in the image. Light source identification module 114 estimates, based on the image, the location of one or more light sources in the 3D representation of the scene generated by module 112 and generates a light model for the scene. Object insertion module 116 inserts objects into the 3D representation of the scene. These objects are typically identified by a user of system 100, but can alternatively be identified in other manners (e.g., by another module of system 100, by another device or system, etc.). Rendering module 118 renders, based on the estimated materials included in the image and the light model for the scene, the 3D representation of the scene to generate a modified 2-dimensional (2D) image. The modified image is the image that was obtained and modified by insertion of the one or more objects. In the modified image, the inserted objects look like they belong in the image, appearing as if the objects were actually part of the scene depicted in the image.

It should be noted that insertion system 108 allows objects to be inserted into an image based on a single image. Insertion system 108 need not have multiple images of the same scene in order to allow objects to be inserted into the image. It should also be noted that insertion system 108 allows objects to be inserted into an image based on the image and without additional data or information (e.g., data regarding lighting) being collected from the physical scene depicted in the image. Some user inputs identifying characteristics of the scene may be received as discussed in more detail below, but no additional information need be collected from the scene itself (from the physical scene depicted in the image).

Figure 2:
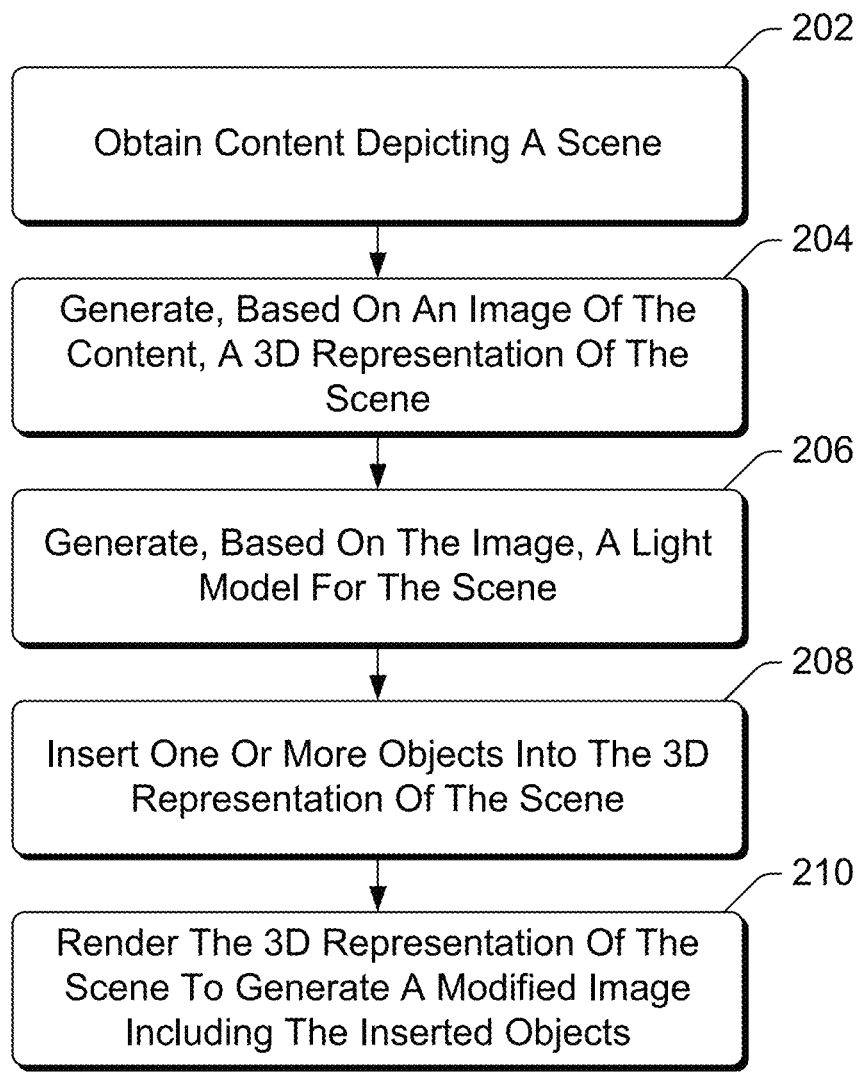
FIG. 2 is a flowchart illustrating an example process for inserting objects into content in accordance with one or more embodiments.

FIG. 2 is a flowchart illustrating an example process 200 for inserting objects into content in accordance with one or more embodiments. Process 200 can be implemented in software, firmware, hardware, or combinations thereof. Process 200 is carried out by, for example, an insertion system 108 of FIG. 1. Process 200 is shown as a set of acts and is not limited to the order shown for performing the operations of the various acts. Process 200 is an example process for inserting objects into content; additional discussions of inserting objects into content are included herein with reference to different figures.

In process 200, content depicting a scene is obtained (act 202). The content can be a single image, or multiple images (e.g., video), and the content can be obtained in various manners as discussed above.

A 3D representation of the scene is generated based on an image of the content (act 204). If the content is a single image then the 3D representation of the scene is generated based on that single image, and if the content is multiple images then the 3D representation of the scene is generated based on one or more of the multiple images. The 3D representation of the scene in the image can be generated in a variety of different manners as discussed below.

A light model for the scene is generated based on the image (act 206). This light model can include interior lighting and/or exterior lighting as discussed in more detail below.

One or more objects are inserted into the 3D representation of the scene (act 208). These one or more objects can take various forms, such as synthetic objects, portions of other pictures, and so forth as discussed in more detail below.

The 3D representation of the scene is rendered to generate a modified image that includes the inserted object (act 210). The modified image is rendered based on the 3D representation of the scene and the identified light sources, as discussed in more detail below.

Returning to FIG. 1, 3D representation generation module 112 generates, based on an image, a 3D representation of the scene in the image. This image (e.g., obtained by content management module 102 as discussed above) is also referred to as the original image. This 3D representation is a model or representation of the scene that is depicted in the image. It should be noted that the 3D representation can be generated by module 112 based on the image, and optionally user inputs, and need not be based on any additional information regarding the physical scene (e.g., actual measurements of the physical scene). 3D representation generation module 112 can generate the 3D representation of the scene in the image in a variety of different manners.

In one or more embodiments, the 3D representation of the scene in the image is generated by automatically identifying scene boundaries within the scene. The scene boundaries can be automatically identified in different manners, such as using the techniques discussed in Hedau, V., Hoiem, D., and Forsyth, D., "Recovering the Spatial Layout of Cluttered Rooms", International Conference on Computer Vision (2009). These scene boundaries refer to boundaries present in the physical scene depicted in the image, such as floors, walls, ceilings, and so forth. The scene boundaries can be a coarse geometric representation of the scene, with scene boundaries being approximately identified—exact scene boundaries need not be identified and all scene boundaries need not be identified. Rather, the techniques discussed herein generate sufficient geometry to model lighting effects, and need not fully describe all aspects of the scene.

Various discussions herein refer to the geometry of a scene or 3D representation of a scene. The geometry of a scene refers to parts (e.g., walls, floors, ceilings, buildings, furniture, etc.) in the scene. The geometry of the 3D representation of a scene refers to the 3D representation of those objects.

Figure 3:
FIG. 3 illustrates an example image of a scene in accordance with one or more embodiments.
Figure 4:
FIG. 4 illustrates an example image of a scene with scene boundaries identified in accordance with one or more embodiments.

FIG. 3 illustrates an example image 300 of a scene (e.g., of a kitchen). The scene boundaries in the scene of image 300 are boundaries between walls, floor, and ceiling. FIG. 4 illustrates an example image 400 of the same scene as image 300, but with scene boundaries identified using dashed lines.

Returning to FIG. 1, 3D representation generation module 112 also automatically generates an estimate of parameters of a camera or other imaging device that captured or would have captured an image (e.g., taken a picture). This estimate can be an estimate of camera parameters for an actual camera, such as for a camera that actually took (or could have taken) a picture of a scene. This estimate can also be an estimate of a virtual or assumed camera for images that are not photographs. For example, if an image is a drawing or painting, then the estimate can be an estimate of camera parameters for a camera that would have captured the image if the image were a photograph.

The estimate of the camera parameters includes, for example, an estimate of camera intrinsics or internal camera parameters such as the focal length and optical center of the camera. The camera parameters are thus also referred to as the camera perspective. The camera parameters can be automatically identified in different manners, such as using the techniques discussed in Hedau, V., Hoiem, D., and Forsyth, D., "Recovering the Spatial Layout of Cluttered Rooms", International Conference on Computer Vision (2009). For example, vanishing points in the image can be estimated. Vanishing points refer to the intersection of 3D parallel lines in 2D. Given multiple vanishing points, the camera parameters can be readily identified.

Additionally, 3D representation generation module 112 allows a user of system 100 to modify scene boundaries. The user may believe that the automatically identified scene boundaries do not accurately identify the actual scene boundaries. The user can provide various inputs to correct these inaccuracies, such as by moving vertices, moving lines, and so forth. For example, referring again to FIG. 4, a user can change the scene boundaries identified by the dashed lines by moving (e.g., dragging and dropping, and resizing as appropriate) one or more vertices of one or more of the dashed lines, by moving one or more of the dashed lines, and so forth.

Similarly, 3D representation generation module 112 allows a user of system 100 to modify vanishing points. The user may believe that the estimated vanishing points do not accurately identify the actual vanishing points. The user can provide various inputs to correct these inaccuracies, such as by moving vertices, moving lines, and so forth. For example, lines used to estimate a vanishing point can be displayed, and a user can change the estimated vanishing point by moving (e.g., dragging and dropping) one or more vertices of a line used to estimate a vanishing point, by moving one or more of the lines used to estimate a vanishing point, and so forth.

Additionally, 3D representation generation module 112 allows a user to identify additional geometry in the scene that may be relevant to inserting objects. This additional geometry typically includes extruded geometry and occluding surfaces. Extruding geometry refers to geometry defined by a closed 2D curve that is extruded along some 3D vector. For example, extruding geometry can include tables, chairs, desks, countertops, and so forth. The extruding geometry identified by a user is typically geometry on which a user desires to have an inserted object placed. For example, if the user desires to have an object inserted on top of a table in the scene, then the user identifies the table as extruding geometry in the scene. Once identified by the user, the extruding geometry can be converted to a 3D model and added to the representation of the 3D scene in a variety of conventional manners based on the bounding geometry and vanishing points identified as discussed above.

Figure 5:
FIG. 5 illustrates an example of user input identifying extruding geometry in accordance with one or more embodiments.

User inputs can identify extruding geometry in a variety of different manners. In one or more embodiments, a user provides inputs to outline or sketch a 2D curve defining a surface boundary, and then provides an input selecting a footprint of the object in the representation of the 3D scene from which the 3D height of the object can be determined. The 3D height of the object can be determined in different manners, such as using the measurement techniques discussed in Criminisi, A., Reid, I., and Zisserman, A., "Single View Metrology", Int. J. Comput. Vision (November, 2000). FIG. 5 illustrates an example of user input identifying extruding geometry. In FIG. 5, an image 500 has drawn on a tabletop an outline 502 of the tabletop, which is illustrated with cross-hatching. Thus, for example, the user can simply draw a line around the surface of the tabletop to identify the tabletop extruding geometry.

Returning to FIG. 1, occluding surfaces refer to surfaces that will occlude an inserted object if the object is inserted behind the occluding surface. Occluding surfaces can be included as part of any of a variety of different geometries, including furniture, books, boxes, buildings, and so forth. Various techniques can be used to create occlusion boundaries for objects. In one or more embodiments, occlusion boundaries for objects are creating using an interactive spectral matting segmentation approach as discussed in Levin, A., Rav-Acha, A., and Lischinski, D., "Spectral Matting", IEEE Pattern Analysis and Machine Intelligence (October, 2008). User inputs can identify occluding surfaces in a variety of different manners, such as by a user providing inputs to scribble on or color in the interior and/or exterior of an object including an occluding surface. The depth of the object can be determined by assuming that the lowermost point on the boundary of the object is the contact point of the object with the floor. However, the depth of the object can alternatively be determined in different manners (e.g., based on whether the object is on the floor, ceiling, wall, etc.). A segmentation matte for the object is determined, which operates as a cardboard cutout in the scene—if an inserted object intersects the segmentation matte in the image space and is also further from the camera than the segmentation matte, then the object is occluded by the cutout.

Figure 6:
FIG. 6 illustrates an example of user input identifying an occluding surface in accordance with one or more embodiments.

FIG. 6 illustrates an example of user input identifying an occluding surface. In image 600, a line 602 has been drawn around the exterior of the occluding surface (an ottoman) and a line 604 drawn around the interior of the occluding surface. Given these two lines 602, 604, the occluding surface can be readily determined.

Returning to FIG. 1, 3D representation generation module 112 is discussed as using both automatic and manual (based on user input) techniques for generating the 3D representation of the scene in the image. It should be noted, however, that 3D representation generation module 112 can alternatively use automatic techniques and not use manual techniques in generating the 3D representation of the scene in the image. Similarly, 3D representation generation module 112 can alternatively use manual techniques and not use automatic techniques in generating the 3D representation of the scene in the image.

Thus, 3D representation generation module 112 generates a 3D representation of the scene in the image, as well as an estimation of the camera perspective for the scene in the image.

Light source identification module 114 estimates, based on the image, the location of one or more light sources in the 3D representation of the scene generated by module 112. Based on these estimations, light source identification module 114 generates a lighting representation or light model of the scene in the image. Light source identification module 114 identifies both interior lighting and exterior lighting. Interior lighting refers to light from sources present in the scene in the image (e.g., lamps, light fixtures, etc.). Exterior lighting refers to light from sources that are external to (not include in) the scene in the image (e.g., sunlight shining through windows).

For interior lighting, in one or more embodiments user input is received indicating light sources in the scene in the image. This user input can take various forms, such as drawing a polygon around (outlining) the light source, scribbling over the light source, dragging and dropping (and resizing as appropriate) a polygon around the light source, and so forth. Based on the user input, a polygon is projected onto the 3D representation of the scene generated by module 112 to define an area light source. If the user input is other than a polygon (e.g., scribbling over a light source) then a polygon is generated based on the user input (e.g., a rectangle including the scribbling is generated). Alternatively, shapes other than polygons can be projected onto the 3D representation of the scene, such as circles.

Light source identification module 114 then automatically refines the locations of the light sources projected onto the 3D representation of the scene. Due to this refinement, the user input identifying a light source need not be exact. Rather, the user input can approximately identify the light source, and rely on light source identification module 114 to refine and correct the location. Light source identification module 114 can use various different objective or optimization functions, or other techniques, to identify a location of a light source given user input that approximately identifies a location of a light source.

In one or more embodiments, light source identification module 114 refines the locations of one or more light sources projected onto the 3D representation of the scene by choosing light parameters to minimize the squared pixel-wise differences between a rendered image (an image rendered using the current lighting parameter vector and 3D representation of the scene) and a target image (the original image). For example, light source identification module 114 seeks to minimize the objective:

$$\operatorname*{argmin}_{L} \sum_{i \in pixels} \alpha_i (R_i(L) - R_i^*)^2 + \sum_{j \in params} w_j (L_j - L_{0_j})^2 \quad (1)$$

$$\text{subject to: } 0 \leq L_j \leq 1 \forall j$$

where R(L) refers to the rendered image parameterized by the current lighting parameter vector L, R* refers to the target image, $L_0$ refers to the initial lighting parameters (as identified from the user input indicating a light source), w refers to a weight vector that constrains lighting parameters near their initial values, α refers to a per-pixel weighting that places less emphasis on pixels near the ground, the "pixels" refer to pixels in the rendered and target images, and the "params" refer to parameters of the lighting parameter vectors L. In one or more embodiments, α is set to 1 for pixels above the spatial midpoint of the scene (height-wise), and decreases quadratically from 1 to 0 (being set to 0 for pixels at the floor of the scene).

Each lighting parameter vector L includes six scalars for each light source. These six scalars include a 3D position (e.g., a scalar for position along an x axis, a scalar for position along a y axis, and a scalar for position along a z axis) and pixel intensity (e.g., using an RGB color model, a scalar for intensity of the color red, a scalar for the intensity of the color green, and a scalar for the intensity of the color blue). Each light parameter is normalized to the range [0,1], and the weight vector w is set to 10 for spatial (3D position) parameters and is set to 1 for intensity (pixel intensity) values.

It should be noted that, to render the 3D representation of the scene and determine R, materials for the geometry are estimated. The materials are estimated using an image decomposition algorithm to estimate surface reflectance (albedo), and the albedo is then projected onto the scene geometry as a diffuse texture map, as discussed in more detail below.

Although specific values for α and w are discussed above, it should be noted that these specific values are examples and that other values can alternatively be used. Additionally, specific lighting parameters are discussed above, although it should be noted that these specific lighting parameters are examples and that other parameters can alternatively and/or additionally be used. For example, lighting parameters could identify directional properties of the light source, distribution of light directions (e.g., the angle of a spotlight cone), and so forth.

Light source identification module 114 uses an intrinsic decomposition technique to estimate the albedo and direct light from the original image (the image into which objects are to be inserted). In one or more embodiments, the intrinsic decomposition technique used by the light source identification module 114 is as follows. First, module 114 determines indirect irradiance by gathering radiance values at each 3D patch of geometry in the 3D representation onto which a pixel in the initial image projects. The gathered radiance values are obtained by sampling observed pixel values from the original image, which are projected onto geometry along the camera perspective. This indirect irradiance image is referred to as Γ, and is equivalent to the integral in the radiosity equation. Module 114 assumes the typical Lambertian assumptions, assuming that the original image B can be expressed as the product of albedo ρ and shading S as well as the sum of reflected direct light D and reflected indirect light I. Furthermore, reflected gathered irradiance is equivalent to reflected indirect lighting under these assumptions. This leads to the equations:

$$B = \rho S, B = D + I, I = \rho \Gamma, B = D + \rho \Gamma \quad (2)$$

Light source identification module 114 decomposes an image B into albedo ρ and direct light D by solving the objective function:

$$\operatorname*{argmin}_{\rho, D} \sum_{i \in pixels} |\Delta \rho|_i + \gamma_1 m_i (\nabla \rho)_i^2 + \gamma_2 (D_i - D_{0_i})^2 + \gamma_3 (\nabla D)_i^2 \quad (3)$$

$$\text{subject to: } B = D + \rho \Gamma, 0 \leq \rho \leq 1, 0 \leq D$$

where $\gamma_1$, $\gamma_2$, and $\gamma_3$ are weights, m is a scalar mask taking large values where B has small gradients (and otherwise taking small values), and $D_0$ is an initial direct lighting estimate. The scalar mask m is defined as a sigmoid applied to the gradient magnitude of B as follows:

$$m_i = 1 - \frac{1}{1 + e^{-s(\|\nabla B\|_i^2 - c)}} \quad (4)$$

where, for example, s=10.0 and c=0.15 (although other values for s and c can alternatively be used).

In the objective function (3), the first two terms coerce p to be piecewise constant. The first term enforces an L1 sparsity penalty on edges in ρ, and the second term smoothes albedo where B's gradients are small. The last two terms smooth D while keeping D near the initial estimate $D_0$. In one or more embodiments, the objective weights are set as $\gamma_1$=0.2, $\gamma_2$=0.9, and $\gamma_3$=0.1, (although these are example values and other values for $\gamma_1$, $\gamma_2$, and/or $\gamma_3$ can alternatively be used). The value ρ is initialized using the color variant of Retinex, for example as discussed in Grosse, R., Johnson, M. K., Adelson, E. H., and Freeman, W. T., "Ground-truth Dataset and Baseline Evaluations for Intrinsic Image Algorithms", International Conference on Computer Vision (2009), although ρ can alternatively be initialized in other manners. The value D is initialized as, for example, $D_0$=B−ρΓ.

In one or more embodiments, for the objective (1) discussed above, the target image is set as the estimate of the direct term D and the 3D representation is rendered using just the direct lighting (as estimated by D).

Although a specific intrinsic decomposition technique is discussed above, it should be noted that various other intrinsic decomposition techniques can alternatively be used. For example, various well-known intrinsic decomposition techniques can be used, such as any of the techniques discussed in Grosse, R., Johnson, M., Adelson, E., and Freeman, W., "Ground truth dataset and baseline evaluations for intrinsic image algorithms" Proceedings of the International Conference on Computer Vision (2009).

Figure 7:
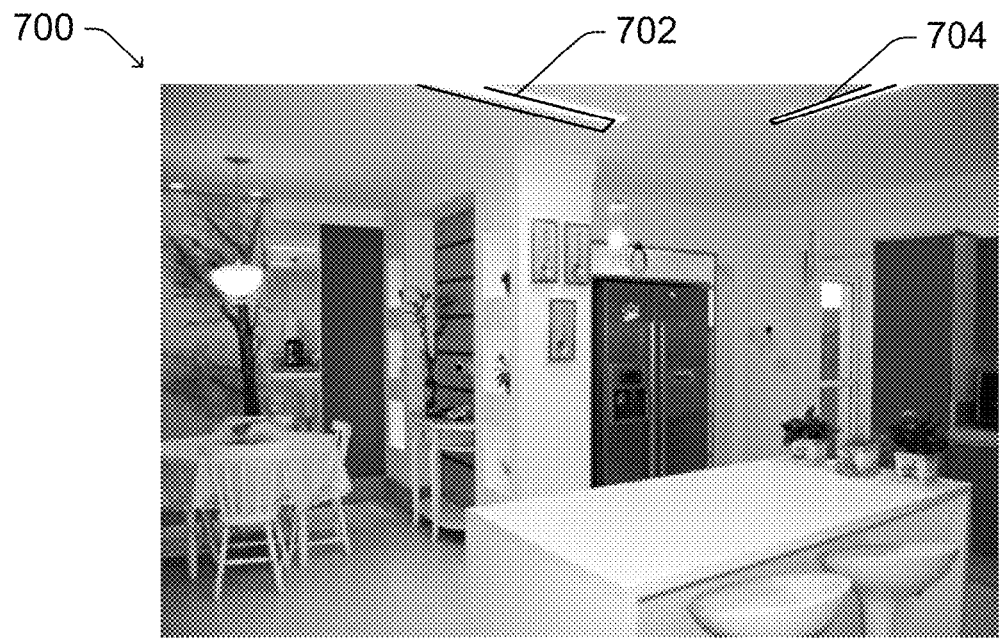
FIG. 7 illustrates an example of user input identifying interior lighting in accordance with one or more embodiments.
Figure 8:
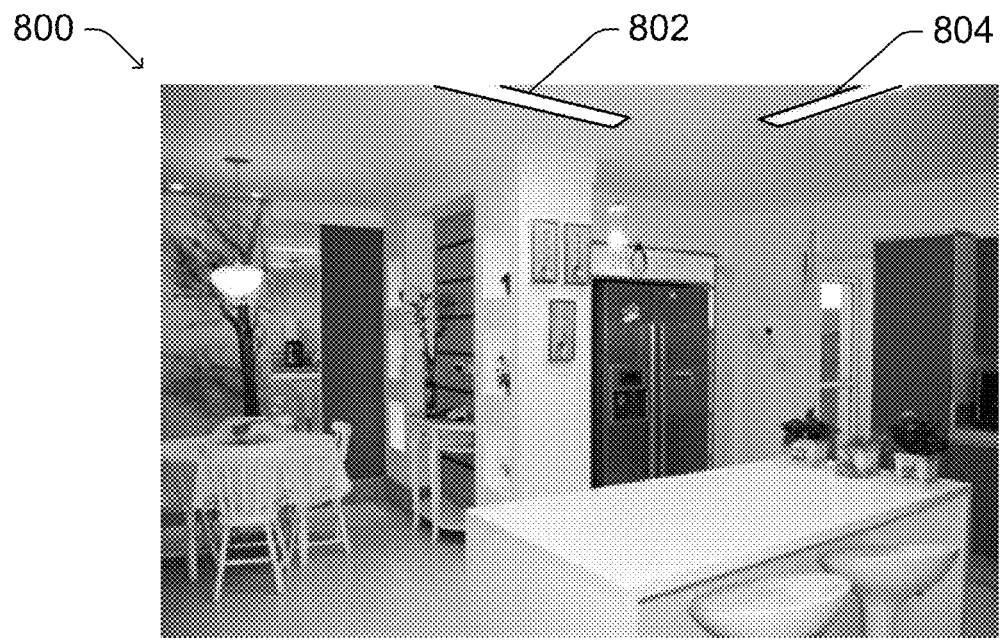
FIG. 8 illustrates an example of refined light source locations in accordance with one or more embodiments.

FIG. 7 illustrates an example of user input identifying interior lighting. In image 700, boxes 702 and 704 have been drawn by a user to indicate the light sources. FIG. 8 illustrates an example of the refined light source locations. In image 800, boxes 802 and 804 identify the interior light sources, having been refined from boxes 702 and 704 drawn by the user.

Returning to FIG. 1, light source identification module 114 also identifies exterior lighting. Exterior lighting or light shafts refer to light from sources that are not included in the scene, such as sunlight shining through windows or other openings, other light sources not included in the image, and so forth. Generally, exterior lighting is identified by identifying a 2D polygonal projection of a shaft of light and a direction of the shaft of light, as discussed in more detail below.

In one or more embodiments, a user input identifying the shafts of light visible in the scene in the image is received. This user input can identify the shafts of light visible in the scene in various manners, such as by the user drawing a bounding box or other polygon encompassing the shafts of light, by the user dragging and dropping (and resizing as appropriate) a polygon onto the shafts of light, by the user scribbling over the shafts of light, and so forth. A user input identifying sources of the shafts of light, if visible in the scene in the image, is also received. This user input can identify the sources of the shafts of light in various manners, analogous to identifying the shafts of light visible in the scene.

Figure 9:
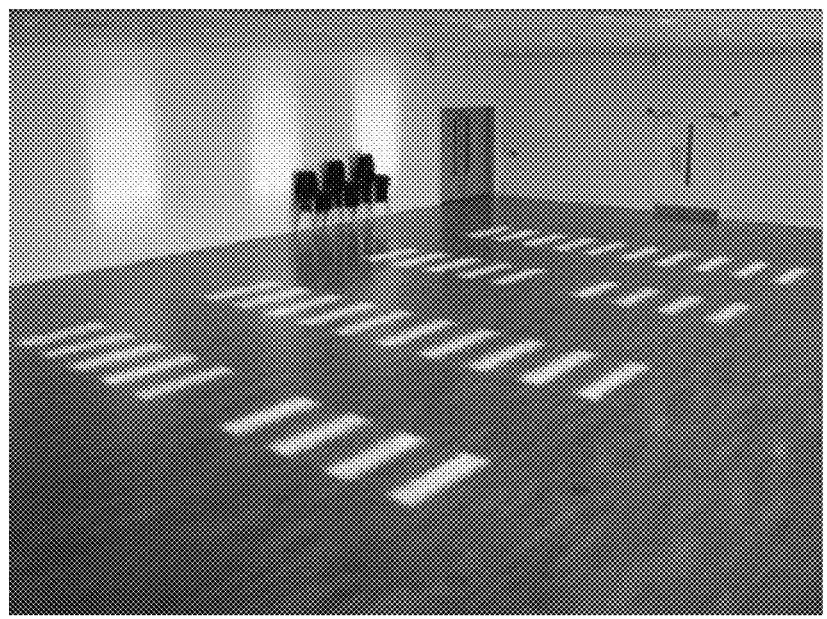
FIG. 9 illustrates an example image including exterior lighting in accordance with one or more embodiments.
Figure 10:
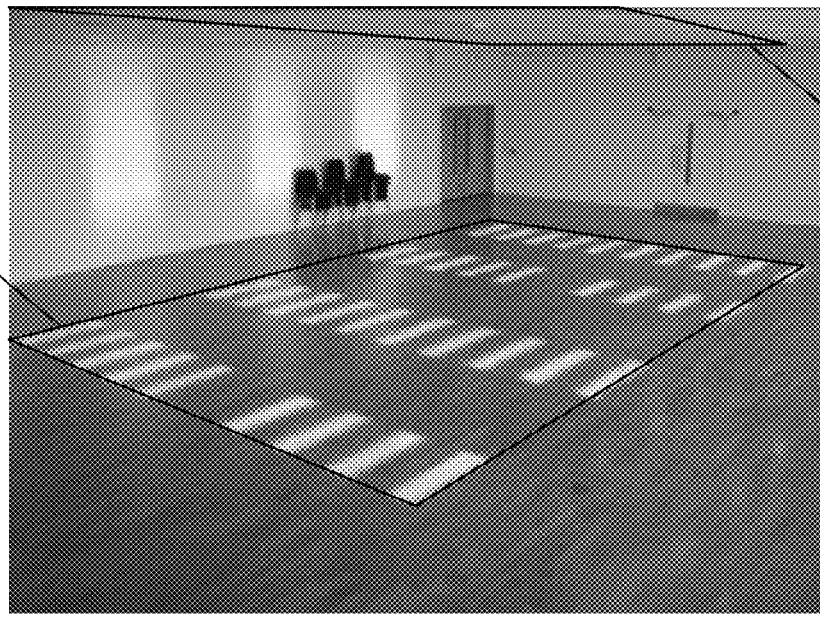
FIG. 10 illustrates an example of user input identifying shafts of light and sources of the shafts of light in accordance with one or more embodiments.

FIG. 9 illustrates an example image 900 including exterior lighting. Shafts of light are visible on the floor in the scene of image 900, with the source of the shafts being openings in the ceiling in the scene of image 900. FIG. 10 illustrates an example of user input identifying shafts of light and sources of the shafts of light. In image 1000, a box 1002 has been drawn encompassing the shafts of light on the floor. Similarly, a box 1004 has been drawn encompassing the sources of the shafts of light in the ceiling.

Returning to FIG. 1, given the shafts of light, a shadow detection algorithm is used to determine a scalar mask that estimates the confidence that a pixel is not illuminated by a shaft. The confidence that a pixel is not illuminated by a shaft is estimated for each pixel in the box encompassing the shafts of light (and optionally additional pixels in the image). Various shadow detection algorithms can be used, such as the shadow detection algorithm discussed in Guo, R., Dai, Q., and Hoiem, D., "Single-image Shadow Detection and Removal Using Paired Regions", IEEE Computer Vision and Pattern Recognition (2011), which models region based appearance features along with pairwise relations between regions that have similar surface material and illumination. A graph cut inference is then performed to identify the regions that have the same material and different illumination conditions, resulting in the confidence mask. The detected shadow mask is then used to recover a soft shadow matte.

The geometry in the 3D representation of the image is then used to recover the shaft direction (the direction of the shafts of light). This shaft direction can be, for example, the direction defined by locations (e.g., midpoints) of the bounding boxes (the boxes encompassing the shafts of light and the sources of the shafts of light). In some situations, the shafts of light or the sources of the shafts of light may not be visible in the image. In such situations, a user input of an estimate of the shaft direction is received. For example, the user can draw an arrow on the image of the shaft direction, drag and drop (and change direction of as appropriate) an arrow on the image in the shaft direction, and so forth. For rendering, shafts of light are represented as masked spotlights (e.g., from an infinitely far spotlight) in the shaft direction.

In some situations, it can be difficult to recover accurate shadow mattes, such as for a window on a wall or a single shaft on a floor. In such situations, for the shadow matte for the source of the shaft of light (e.g., a window on a wall), the detected shadow mask is projected on the floor (or other surface the shaft of light illuminates) along the shaft direction to obtain the mapping on the wall (or ceiling, floor, etc.), and a modified shadow matte result generated by averaging a shadow matte recovered for the wall and a shadow matte recovered for the floor. Similarly, for the shadow matte for the shaft of light (e.g., a single shaft on a floor), the detected shadow mask is projected on the wall (or other surface that is the source of the shaft of light) opposite the shaft direction to obtain the mapping on the floor (or other surface the shaft of light illuminates), and a modified shadow matte result generated by averaging a shadow matte recovered for the wall and a shadow matte recovered for the floor.

Light source identification module 114 also estimates the materials for the geometry in the 3D representation of the scene. This geometry includes the automatically identified geometry as well as user-specified geometry (e.g., extruded geometry and occluding surfaces as discussed above). Module 114 assigns a material to the geometry in the 3D representation based on the albedo estimated during the image decomposition discussed above. The estimated albedo is projected along the camera's view vector (the perspective of the camera) onto the estimated geometry, and the objects are rendered with a diffuse texture corresponding to the projected albedo. This projection can also apply to out-of-view geometry, such as a wall behind the camera or other hidden geometry.

Light source identification module 114 is discussed as using both automatic and manual (based on user input) techniques for estimating light sources in the 3D representation of the scene. It should be noted, however, that light source identification module 114 can alternatively use automatic techniques and not use manual techniques in estimating light sources in the 3D representation of the scene. For example, rather than receiving user inputs identifying light sources, light fixtures can be automatically identified based on the brightness of pixels in the image (e.g., the brightness of pixels in the ceiling to identify ceiling light fixtures). Similarly, light source identification module 114 can alternatively use manual techniques and not use automatic techniques in generating the 3D representation of the scene in the image (e.g., not automatically refine the locations of the light sources projected onto the 3D representation of the scene).

Figure 11:
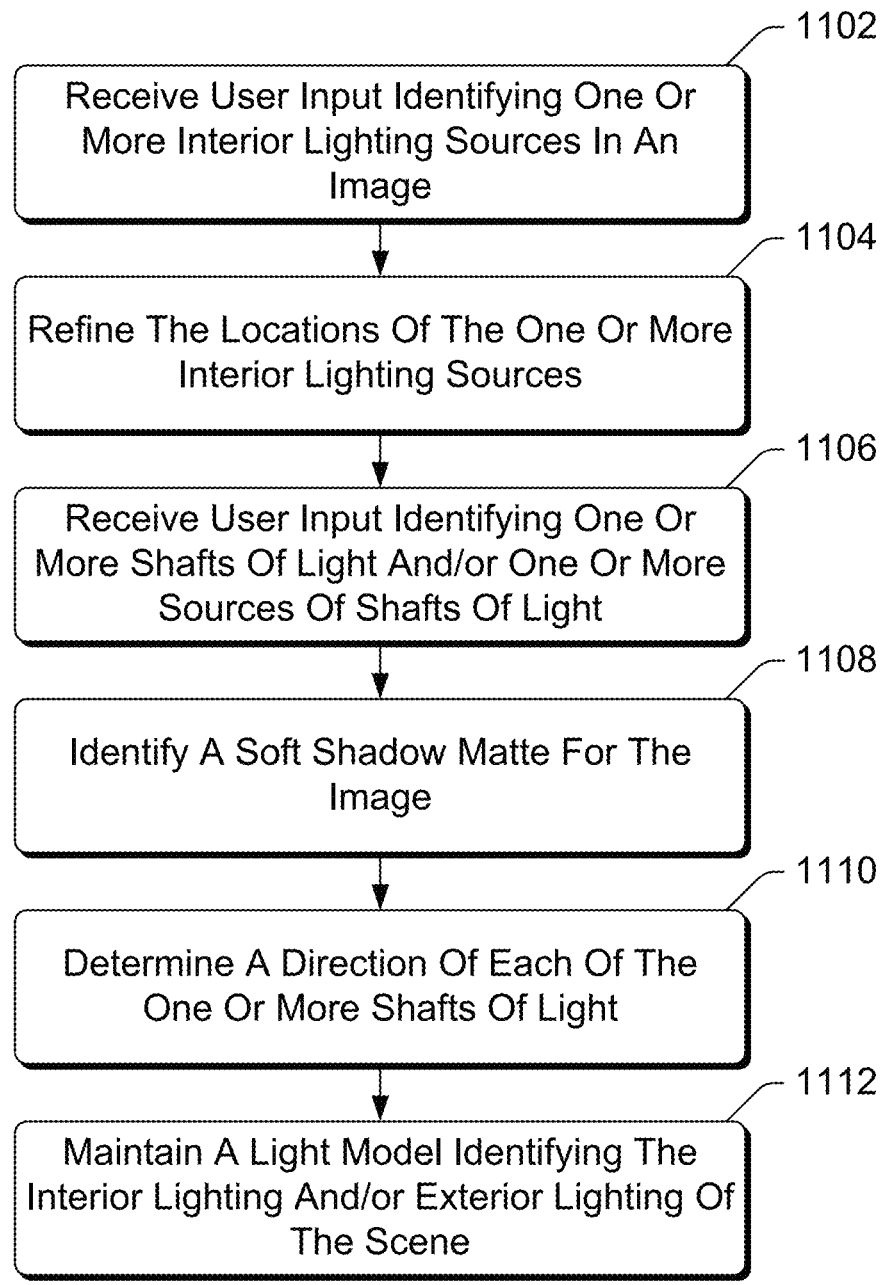
FIG. 11 is a flowchart illustrating an example process for generating a light model in accordance with one or more embodiments.

FIG. 11 is a flowchart illustrating an example process 1100 for generating a light model in accordance with one or more embodiments. Process 1100 can be implemented in software, firmware, hardware, or combinations thereof. Process 1100 is carried out by, for example, light source identification module 114 of FIG. 1. Process 1100 is shown as a set of acts and is not limited to the order shown for performing the operations of the various acts. Process 1100 is an example process for generating a light model; additional discussions of generating a light model are included herein with reference to different figures.

In process 1100, user input identifying one or more interior lighting sources in an image is received (act 1102). This user input can take various forms as discussed above.

Locations of the one or more interior lighting sources are automatically refined (act 1104). These locations can be refined in different matters as discussed above.

User input identifying one or more shafts of light and/or one or more sources of shafts of light is also received (act 1106). These shafts of light are exterior lighting as discussed above, and this user input can take various forms as discussed above.

A soft shadow matte for the image is generated (act 1108). The soft shadow matte indicates an amount of shadowing of each pixel in the image as discussed above, and various matting methods can be used to generate the soft shadow matte as discussed above.

For each of the one or more shafts of light, a direction of the shaft of light is also determined (act 1110). This direction can be determined in different manners, as discussed above.

A light model identifying the interior lighting and/or exterior lighting of the scene is maintained (act 1112). This light model can include indications of light sources (whether interior lighting sources or sources of shafts of light), directions of shafts of lights, and the soft shadow matte.

FIG. 11 discusses acts performed for both interior lighting and exterior lighting. It should be noted that if an image includes no interior lighting, then acts 1102 and 1104 need not be performed. Similarly, if an image includes no exterior lighting, then acts 1106, 1108, and 1110 need not be performed.

Returning to FIG. 1, object insertion module 116 inserts one or more objects into the 3D representation of the scene. These one or more objects can be identified by a user of system 100 in various manners, such as dragging and dropping objects from an object collection, selecting objects from a menu, selecting objects (e.g., cutouts) from another image, and so forth. These one or more objects can alternatively be identified in other manners (e.g., by another module of system 100, by another device or system, etc.). The location of each object within the scene is identified by the user (e.g., the location where the object is dropped in the scene) or by the other module, device, system, etc. that identifies the object.

These objects can take various forms. In one or more embodiments, each object is a synthetic object, which refers to a 3D textured mesh. Such synthetic objects can be any type of material. Alternatively, objects can be other forms rather than a 3D textured mesh, such as a portion of an image (e.g., an object cutout or copied from another image).

Rendering module 118 renders the 3D representation of the scene to generate a modified 2D image, which is the original image that was obtained and modified by insertion of the one or more objects. The rendering is based on various inputs including the 3D representation of the scene, as well as the light model indicating the interior and/or exterior lighting sources for the image, the estimated materials included in the image, and the soft shadow matte for the image. The 3D representation of the scene can be rendered, based on these inputs, in a variety of different conventional manners. In one or more embodiments, the 3D representation of the scene is rendered using the LuxRender renderer (available at the web site "luxrender.net").

The rendered image is then composited back into the original image. The rendered image can be composited back into the original image in various manners, such as using the additive differential rendering method discussed in Debevec, P., "Rendering synthetic objects into real scenes: bridging traditional and image-based graphics with global illumination and high dynamic range photography", Proceedings of the 25th annual conference on Computer graphics and interactive techniques, SIGGRAPH (1998). This additive differential rendering method generates a final composite image as follows:

$$I_{final} M \odot I_{obj} + (1-M) \odot (I_{obj} - I_{noobj}) \qquad (5)$$

where $I_{final}$ refers to the final composite image, $I_{obj}$ refers to a rendered image including inserted objects, $I_{noobj}$ refers to a rendered image without inserted objects, $I_b$ refers to the original image, M refers to an object mask (a scalar image that is 0 everywhere where no object is present, and (0, 1] otherwise), and $\odot$ is the Hadamard product.

Additionally, in one or more embodiments, an object can be animated. An animated object refers to an object that changes or moves over time. For example, an object may bounce or float around within a scene, an object may melt over time within a scene, and so forth. Such animated objects can be readily inserted into images using the techniques discussed above in various manners. For example, when the animated object changes (in appearance, location, etc.), the previous version of the object that was inserted into the 3D representation of the scene is removed from the 3D representation of the scene (e.g., by object insertion module 116), the new version of the object is inserted into the 3D representation of the scene, and a new modified image is generated by rendering the 3D representation of the scene with the inserted new version of the object. The previously generated 3D representation of the scene and light model can be re-used, and need not be regenerated each time the animated object changes.

The content into which an object can be inserted can be an image, or alternatively a video in which a camera is panning around a scene or is otherwise moving. An object can be inserted into a video by selecting one frame of the video that will include the inserted object. A 3D representation of the scene, the light model indicating the interior and/or exterior lighting sources for the image, the estimated materials included in the image, and the soft shadow matte for the video are generated treating the selected frame as an image as discussed above. It should be noted that in some situations one or more additional frames of the video can also be selected, and a 3D representation of the scene, the light model indicating the interior and/or exterior lighting sources for the image, the estimated materials included in the image, and the soft shadow matte for the video are generated treating the selected frame as an image as discussed above. These one or more additional frames depict at least part of a scene not depicted in the other selected frames. Which frames are selected can be identified in different manners, although the frames are selected so as to be able to generate a 3D representation of the entire (or at least a threshold amount of) the scene. For example, content can be a video generated by panning a camera across a room. The portion of the room depicted in one frame can be (and oftentimes is due to the panning) different from the portion of the room depicted in other frames. By selecting multiple frames of the video, a 3D representation of the room can be generated (as well as the light model indicating the interior and/or exterior lighting sources for the selected frames, the estimated materials included in the selected frames, and the soft shadow matte for the selected frames are generated treating the selected frames) rather than a 3D representation of only the portion of the room depicted in a selected image.

Camera matching or "match moving" techniques are used to determine the internal camera parameters (e.g., focal length and optical center) as well as camera extrinsics or external camera parameters such as the relative motion of the camera throughout the video (e.g., the camera position, rotation, and so forth for each frame in the video sequence). Various different conventional camera matching techniques or systems can be used to determine the internal and/or external camera parameters, such as the Voodoo Camera Tracker (available from digilab at the web site "digilab.uni-hannover.de") or the boujou match moving software (available from Vicon of Oxford, UK). The 3D representation of the scene, the light model indicating the interior and/or exterior lighting sources for each selected frame, the estimated materials included in each selected frame, and the soft shadow matte generated based on each selected frame can be used to render the scene from each synthetic camera viewpoint as determined by the camera matching technique or system.

In the discussions above regarding an image, the camera parameters are estimated based on vanishing points. However, if the content is video, the camera matching technique or system estimates a new set of camera parameters that may be different from the estimates based on the vanishing points. To account for these differences, the 3D representation and light model are warped using a 4×4 projective (linear) transformation (a 3D homography). This homography can be obtained in various manners, such as by minimizing the squared distance of the re-projection of the vertices of the 3D representation onto the image plane under the determined homography.

In one or more embodiments, the homography is obtained as follows. A 3×4 projection matrix is generated that encodes various camera parameters. The encoded parameters can be, for example, camera position, rotation, focal length, and optical center, although other camera parameters can alternatively be used. This projection matrix is a transformation that maps 3D homogeneous coordinates in object space to 2D homogeneous coordinates in image space. In other words, the projection matrix can be used to determine where 3D geometry in the scene will project onto the 2D image.

A projection matrix referred to as P is estimated by the camera matching technique or system discussed above, and a projection matrix $P_0$ is estimated based on the image (e.g., based on vanishing points) as discussed above. Various different objective or optimization functions, or other techniques, can be used to generate the 3D projective transformation H.

In one or more embodiments, an optimization procedure is used to find the 3D projective transformation H that reduces (e.g., minimizes) the difference in image-space reprojection error of the 3D representation of the scene using the new projection matrix P by applying the projective transformation H. An example of such an optimization procedure is:

$$\operatorname*{argmin}_{H} \sum_{v \in Vertices} \|PHv - P_0 v\| \quad (6)$$

where $v=(x, y, z, 1)^T$ is the 3D homogenous coordinate of a given vertex of geometry in the 3D representation of the scene, and the "Vertices" refer to vertices in the geometry in the 3D representation of the scene.

After the projective transformation H is obtained, the geometric estimates (e.g., bounding geometry, light locations in the light model, etc.) made based on the image are warped using the projective transformation H. Thus, the projection of these geometric estimates using projection matrix P will match (e.g., be the same as or approximately the same as) the projection of these geometric estimates using projection matrix $P_0$. For example, each 3D vertex value is replaced by the product of H and the original vertex value ($v \leftarrow Hv$).

Using the warped geometric estimates and the projection matrix P estimated by the camera matching technique or system, each frame of the video can be rendered as an image as discussed above, although the camera parameters included in projection matrix P are used rather than the camera parameters included in projection matrix $P_0$ estimated based on the image (e.g., based on vanishing points).

Figure 12:
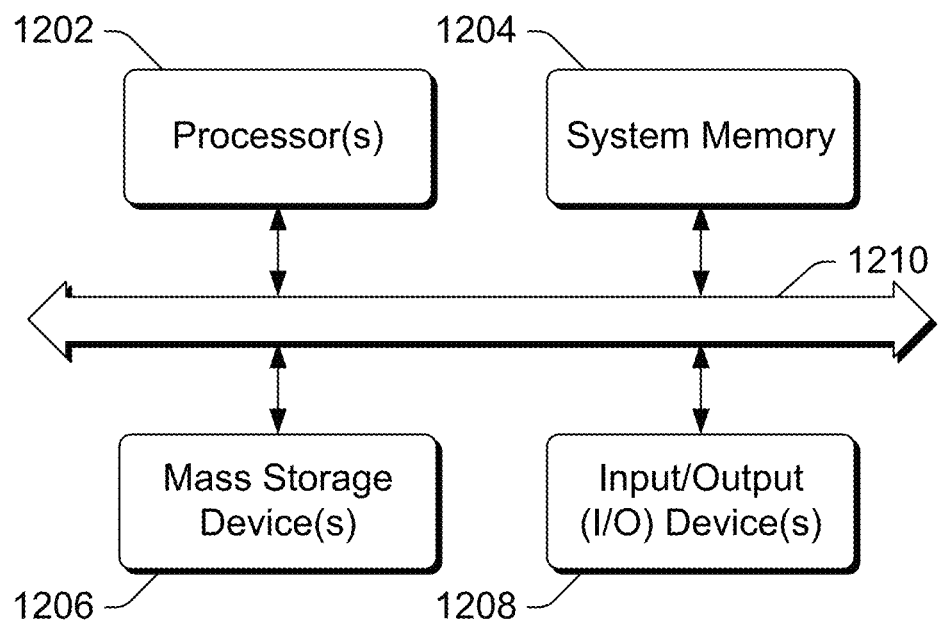
FIG. 12 is a block diagram illustrating an example computing device in which the inserting objects into content can be implemented in accordance with one or more embodiments.

FIG. 12 is a block diagram illustrating an example computing device 1200 in which the inserting objects into content can be implemented in accordance with one or more embodiments. Computing device 1200 can be used to implement the various techniques and processes discussed herein. Computing device 1200 can be any of a wide variety of computing devices, such as a desktop computer, a server computer, a handheld computer, a laptop or netbook computer, a tablet or notepad computer, a personal digital assistant (PDA), an internet appliance, a game console, a set-top box, a cellular or other wireless phone, a digital camera, audio and/or video players, audio and/or video recorders, and so forth.

Computing device 1200 includes one or more processor(s) 1202, computer readable media such as system memory 1204 and mass storage device(s) 1206, input/output (I/O) device(s) 1208, and bus 1210. One or more processors 1202, at least part of system memory 1204, one or more mass storage devices 1206, one or more of devices 1208, and/or bus 1210 can optionally be implemented as a single component or chip (e.g., a system on a chip).

Processor(s) 1202 include one or more processors or controllers that execute instructions stored on computer readable media. The computer readable media can be, for example, system memory 1204, mass storage device(s) 1206, and/or other storage devices. Processor(s) 1202 may also include computer readable media, such as cache memory. The computer readable media refers to media for storage of information in contrast to mere signal transmission, carrier waves, or signals per se. However, it should be noted that instructions can also be communicated via various signal bearing media rather than computer readable media.

System memory 1204 includes various computer readable media, including volatile memory (such as random access memory (RAM)) and/or nonvolatile memory (such as read only memory (ROM)). System memory 1204 may include rewritable ROM, such as Flash memory.

Mass storage device(s) 1206 include various computer readable media, such as magnetic disks, optical discs, solid state memory (e.g., Flash memory), and so forth. Various drives may also be included in mass storage device(s) 1206 to enable reading from and/or writing to the various computer readable media. Mass storage device(s) 1206 include removable media and/or nonremovable media.

I/O device(s) 1208 include various devices that allow data and/or other information to be input to and/or output from computing device 1200. Examples of I/O device(s) 1208 include cursor control devices, keypads, microphones, monitors or other displays, speakers, printers, network interface cards, modems, lenses, CCDs or other image capture devices, and so forth.

Bus 1210 allows processor(s) 1202, system 1204, mass storage device(s) 1206, and I/O device(s) 1208 to communicate with one another. Bus 1210 can be one or more of multiple types of buses, such as a system bus, PCI bus, IEEE 1394 bus, USB bus, and so forth.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable media, further description of which may be found with reference to FIG. 12. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth. The features of the inserting objects into content techniques described herein are platform-independent, meaning that the techniques can be implemented on a variety of commercial computing platforms having a variety of processors.

Although the description above uses language that is specific to structural features and/or methodological acts in processes, it is to be understood that the subject matter defined in the appended claims is not limited to the specific features or processes described. Rather, the specific features and processes are disclosed as example forms of implementing the claims. Various modifications, changes, and variations apparent to those skilled in the art may be made in the arrangement, operation, and details of the disclosed embodiments herein.

What is claimed is:

1. A method implemented in one or more computing devices, the method comprising:
 obtaining a single image of a scene;
 generating, based on the single image of the scene, a 3D model of the scene;
 generating, based on the single image of the scene and in the absence of other images of the scene, a light model including 3D light source locations, directions, and intensities for the scene;
 correcting the light model by automatically refining the locations of light sources projected onto the 3D model of the scene, the automatically refining including choosing light parameters by at least one of the one or more computing devices minimizing an objective function that is based on a rendered image of the scene and the single image of the scene in the absence of other images of the scene, the objective function being further based on applying a per-pixel weighting that places less emphasis on pixels near the ground;
 inserting one or more objects into the 3D model of the scene; and
 modifying the appearance of the single image, based on both the corrected light model and the 3D model of the scene, producing a modified image of the scene that depicts the scene as if the one or more objects were actually part of the scene.

2. A method as recited in claim 1, the generating the light model comprising generating the light model based on the single image in the absence of additional data regarding lighting collected from the physical scene depicted in the single image.

3. A method as recited in claim 1, the generating the 3D model comprising automatically identifying scene boundaries and receiving a user input adjusting the scene boundaries.

4. A method as recited in claim 3, further comprising:
 receiving a user input identifying extruding geometry on which an object can be inserted;
 converting the extruded geometry to a 3D model; and
 adding the 3D model of the extruded geometry to the 3D model of the scene.

5. A method as recited in claim 3, further comprising receiving a user input identifying a surface that would occlude an object inserted behind the surface.

6. A method as recited in claim 1, the single image of the scene comprising a frame of video of the scene, and the modifying including modifying the video of the scene.

7. A method as recited in claim 1, the generating the light model comprising:
 identifying, based on the single image, locations of one or more interior lighting sources in the single image; and
 maintaining, as at least part of the light model, the locations of one or more interior lighting sources in the single image.

8. A method as recited in claim 7, the identifying locations of one or more interior lighting sources in the single image comprising receiving user input identifying locations of interior lighting sources, and the automatically refining comprising automatically refining the user identified locations.

9. A method as recited in claim 1, the generating the light model comprising:
 identifying, based on the image, locations of one or more shafts of light in the single image;
 identifying an amount of shadowing of each of multiple pixels in the one or more shafts of light;
 determining a direction of each of the one or more shafts of light; and
 maintaining, as at least part of the light model, the locations of one or more shafts of light in the single image, the amount of shadowing of each of multiple pixels in the one or more shafts of light, and the direction of each of the one or more shafts of light.

10. A method as recited in claim 9, the identifying locations of one or more shafts of light in the single image comprising receiving a user input identifying the locations of the one or more shafts of light.

11. A method as recited in claim 9, the determining comprising receiving a user input identifying one or more sources of the one or more shafts of light, and determining the direction based on locations in polygons encompassing the one or more sources and the one or more shafts of light.

12. A method as recited in claim 9, the determining the direction of each of the one or more shafts of light comprising determining, for one of the one or more shafts of light, the direction of the one shaft of light based on a user input of an estimate of the direction of the one shaft of light.

13. A method as recited in claim 1, further comprising using an intrinsic decomposition technique to estimate an albedo and direct light from the single image by solving an additional objective function.

14. A method as recited in claim 13, wherein the albedo is an albedo $\rho$, the direct light is a direct light D, $\gamma 1$ is a first weight, $\gamma 2$ is a second weight, $\gamma 3$ is a third weight, m is a scalar mask, $D_0$ is an initial direct lighting estimate, and the additional objective function is:

$$\operatorname*{argmin}_{\rho,D} \sum_{i \in pixels} |\Delta \rho|_i + \gamma_1 m_i (\nabla \rho)_i^2 + \gamma_2 (D_i - D_{0_i})^2 + \gamma_3 (\nabla D)_i^2.$$

15. A method as recited in claim 1, the generating the light model further comprising:
receiving user input identifying locations of one or more lighting sources.

16. A method as recited in claim 1, the modifying further comprising:
generating the rendered image by rendering the 3D model of the scene based on the 3D model of the scene including the inserted one or more objects as well as the light model and a soft shadow matte for the single image; and
generating a final composite image by using a function to composite the rendered image into the single image of the scene.

17. A method as recited in claim 16, where $I_{final}$ is the final composite image, $I_{obj}$ is the rendered image, $I_{noobj}$ is a rendered image of the scene without the one or more objects, $I_b$ is the single image of the scene, M is an object mask, $\odot$ is a Hadamard product, and the function is:

$I_{final} = M \odot I_{obj} + (1-M) \odot (I_b + I_{obj} - I_{noobj})$.

18. A method as recited in claim 1, at least one of the one or more objects comprising an animated object that changes or moves over time.

19. A method as recited in claim 1, the objective function comprising a function that minimizes squared pixel-wise differences between the rendered image of the scene and the single image of the scene.

20. One or more computer readable media having stored thereon multiple instructions that, when executed by one or more processors of a device, cause the one or more processors to perform acts comprising:
obtaining a single image of a scene;
identifying, based on the single image of the scene and in the absence of other images of the scene, locations of one or more interior lighting sources in the single image;
identifying, based on the single image of the scene and in the absence of other images of the scene, locations of one or more shafts of light in the single image;
identifying an amount of shadowing of each of multiple pixels in the one or more shafts of light;
determining a direction of each of the one or more shafts of light;
correcting a light model by automatically refining the locations of the one or more interior lighting sources, the automatically refining including choosing light parameters by execution of at least one of the multiple instructions to minimize an objective function based on applying a per-pixel weighting that places less emphasis on pixels near the ground as well as based on a rendered image of the scene and the single image of the scene in the absence of other images of the scene;
maintaining, as the light model, the automatically refined locations of the one or more interior lighting sources in the single image, the locations of one or more shafts of light in the single image, the amount of shadowing of each of multiple pixels in the one or more shafts of light, and the direction of each of the one or more shafts of light; and
modifying the appearance of the single image, based on both the light model and a 3D model of the scene, producing a modified image of the scene that depicts the scene as if the one or more objects were actually part of the scene.

21. The one or more computer readable media as recited in claim 20, the identifying locations of one or more interior lighting sources in the single image comprising receiving user input identifying locations of interior lighting sources, and the automatically refining comprising automatically refining the user identified locations.

22. The one or more computer readable media as recited in claim 20, wherein R(L) is the rendered image parameterized by a current lighting parameter vector L, R* is the single image of the scene, $L_0$ is initial lighting parameters, w is a weight vector that constrains lighting parameters near their initial values, $\alpha$ is the per-pixel weighting, and the objective function is:

$$\operatorname*{argmin}_{L} \sum_{i \in pixels} \alpha_i (R_i(L) - R_i^*)^2 + \sum_{j \in params} w_j (L_j - L_{0_j})^2.$$

23. The one or more computer readable media as recited in claim 20, the acts further comprising using an intrinsic decomposition technique to estimate an albedo and direct light from the single image by solving an additional objective function.

24. The one or more computer readable media as recited in claim 23, wherein the albedo is an albedo $\rho$, the direct light is a direct light D, $\gamma_1$ is a first weight, $\gamma_2$ is a second weight, $\gamma_3$ is a third weight, m is a scalar mask, $D_0$ is an initial direct lighting estimate, and the additional objective function is:

$$\operatorname*{argmin}_{\rho,D} \sum_{i \in pixels} |\Delta \rho|_i + \gamma_1 m_i (\nabla \rho)_i^2 + \gamma_2 (D_i - D_{0_i})^2 + \gamma_3 (\nabla D)_i^2.$$

25. The one or more computer readable media as recited in claim 20, the identifying locations of one or more shafts of light in the single image comprising receiving a user input identifying the locations of the one or more shafts of light.

26. The one or more computer readable media as recited in claim 25, the determining comprising receiving a user input identifying one or more sources of the one or more shafts of light, and determining the direction based on locations in polygons encompassing the one or more sources and the one or more shafts of light.

27. A device comprising:
one or more processors; and
one or more computer readable media having stored thereon multiple instructions that, when executed by the one or more processors, cause the one or more processors to:
obtain a single image of a scene;
generate, based on the single image of the scene, a 3D model of the scene;
generate, based on the single image of the scene and in the absence of other images of the scene, a light model including 3D light source locations, directions, and intensities for the scene;
correct the light model by automatically refining the locations of light sources projected onto the 3D model of the scene, the automatically refining including choosing light parameters by the one or more processors minimizing an objective function that is based on a rendered image of the scene and the single image of the scene in the absence of other images of the scene, the objective function being further based on applying a per-pixel weighting that places less emphasis on pixels near the ground;
estimate materials for geometry in the 3D model of the scene;
insert one or more objects into the 3D model of the scene; and
modify the appearance of the single image, based on the light model as well as the estimated materials and the 3D model of the scene, producing a modified image of the scene that depicts the scene as if the one or more objects were actually part of the scene.

28. A device as recited in claim 27, the instructions causing the one or more processors to generate the light model including instructions causing the one or more processors to:
identify, based on the image, locations of one or more interior lighting sources in the single image; and
maintain, as at least part of the light model, the locations of one or more interior lighting sources in the single image.

29. A device as recited in claim 28, the instructions causing the one or more processors to identify locations of one or more interior lighting sources in the single image comprising instructions causing the one or more processors to receive user input identifying locations of interior lighting sources, and the automatically refining comprising automatically refining the user identified locations.

30. A device as recited in claim 28, the instructions causing the one or more processors to identify the light model further including instructions causing the one or more processors to:
identify, based on the single image, locations of one or more shafts of light in the single image;
identify an amount of shadowing of each of multiple pixels in the one or more shafts of light;
determine a direction of each of the one or more shafts of light; and
maintain, as at least part of the light model, the locations of one or more shafts of light in the single image, the amount of shadowing of each of multiple pixels in the one or more shafts of light, and the direction of each of the one or more shafts of light.

* * * * *